T. Beach,
Caster Wheel.
Nº 42,338. Patented Apr. 19, 1864.

Witnesses.
D. Robertson
Thos. J. Douglas

UNITED STATES PATENT OFFICE.

THADDEUS BEACH, OF NEW YORK, N. Y.

IMPROVED CASTER-WHEEL.

Specification forming part of Letters Patent No. 42,338, dated April 19, 1864.

*To all whom it may concern:*

Be it known that I, THADDEUS BEACH, of the city, county, and State of New York, have invented a new and useful Improvement in Casters and Caster-Wheels; and I do hereby declare that the following is a full, clear, and exact description of the same, reference being had to the accompanying drawings, making a part of this specification, in which—

Figure 1:
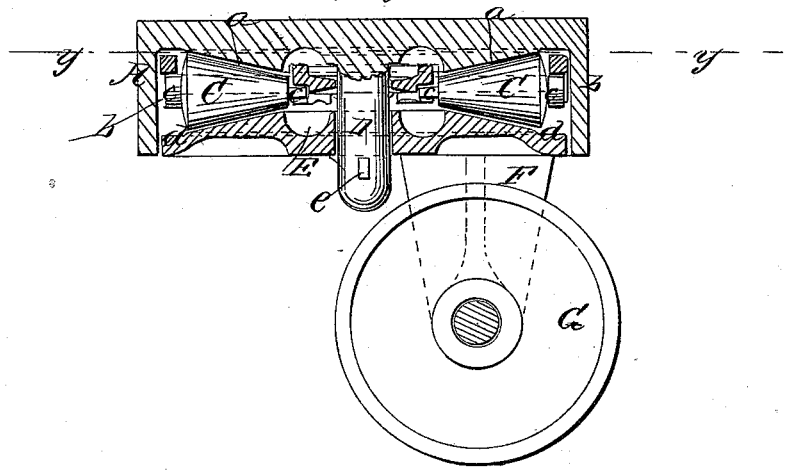
Figure 2:
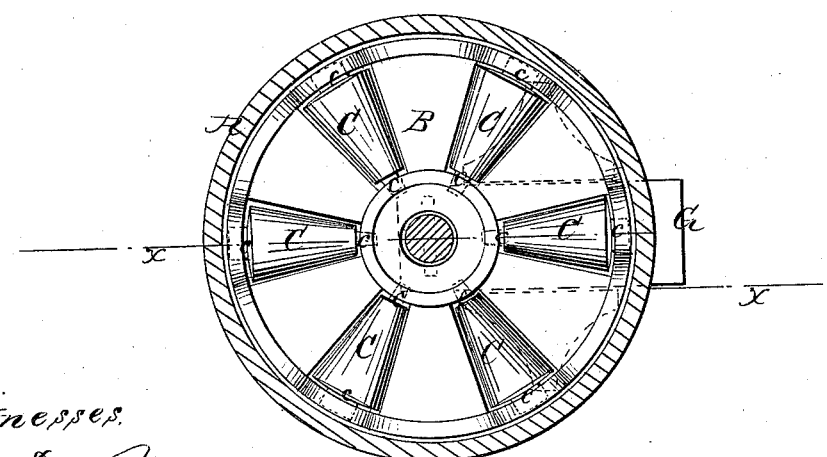

Figure 1 is a vertical section of my invention, taken in the line $x$ $x$, Fig. 2; Fig. 2, a horizontal section of the same, taken in the line $y$ $y$, Fig. 1.

Similar letters of reference indicate corresponding parts in the two figures.

The object of this invention is to reduce friction in the turning of the support of a caster wheel or roller while the latter is adjusting itself to the line of the movement of the article to which it is attached, and at the same time admit of the wheel or roller being nearer the center of its support, whereby a more direct bearing than hitherto is obtained on the caster wheel or roller, and the latter made to act much more efficiently in supporting the article which acts upon it.

To enable those skilled in the art to fully understand and construct my invention, I will proceed to describe it.

A represents a box of cylindrical form, and opens at its bottom or lower end. The under surface, $a$, of the top of this box is of beveled or inverted conical form, and within the box there is placed a circular frame, B, provided at its under side with notches or recesses $b$, which serve as bearings for the journals $c$ of a series of conical rollers, C, apertures being in the frame for the rollers to work or turn in, so that the peripheries of the rollers may be in contact with the under surface, $a$, of the top of the box.

The top of the box has a pendent pin, D, which projects down from the center of its top and through the center of the frame B, the latter being allowed to turn freely on or around the pendent pin D. This pin D also passes loosely through the center of a circular plate, E, the upper surface, $d$, of which is beveled or of conical form and bears against the rollers C. This plate E has a pendent fork, F, attached to it at one side of its center to receive the wheel or roller G.

The inclination or bevel of the under surface, $a$, of the top of the box A, and the upper surface, $d$, of the plate E correspond to the inclination of the peripheries of the rollers C, so that a perfect bearing of the peripheries of said rollers will be obtained on the surfaces $a$ $d$, as will be seen by referring to Fig. 1.

The article which the caster wheel or roller supports rests upon or is attached to the box A, and it will be seen that in consequence of the interposition of the conical rollers C between the beveled or inclined surfaces $a$ $d$ the plate E will readily turn wherever the article which the caster wheel or roller supports is moved, and the wheel or roller thereby enabled to adjust itself in line with the direction of the movement of the article. All the friction to contend with in the turning of the plate E is simply rolling friction, which is slight. On account of this ready turning of the plate E, the fork F, in which the wheel or roller G is placed, may be quite near the center of the plate E, and consequently the wheel or roller will receive the weight of the article on box A in quite a direct manner, and all side or lateral strain on the working or moving parts avoided. The moving surfaces—that is to say, the peripheries of the rollers C and the upper surface, $d$, of the plate E—have the same relative speed at every point of contact, owing to their inclined form, and hence there is no drag or slip of either of said parts, and for the same reason there is no slip or drag of the rollers on the inclined or beveled surface $a$ at the under side of the top of the box A.

In the lower end of the pendent pin D there is a transverse key, $e$, which is simply designed for holding the plate E in position when the caster wheel or roller is raised. The frame B holds the rollers C in proper position relatively with each other. The rollers C might be fitted in permanent bearings in the box A, and the frame B dispensed with; but the latter is preferable, and it relieves the journal $c$ of the weight of the article which the caster wheel or roller supports.

Having thus described my invention, what

I claim as new, and desire to secure by Letters Patent, is—

A caster wheel or roller having its fork or support F attached to a circular plate, E, provided with an upper beveled or inclined surface, $d$, and fitted within a circular box, A, having an inclined or beveled under surface, $a$, with conical rollers C interposed between the inclined or beveled surfaces $a\,d$, and either with or without the frame B, substantially as herein set forth.

THADDEUS BEACH.

Witnesses:
  D. ROBERTSON,
  THOS. S. J. DOUGLAS.